United States Patent
Clopton

(12) 
(10) Patent No.: US 6,237,755 B1
(45) Date of Patent: *May 29, 2001

(54) CHAIN DRIVE WITH ADJUSTABLE FRICTION

(75) Inventor: Robert T. Clopton, Magnolia, KY (US)

(73) Assignee: Tekno, Inc., Cave City, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/363,335

(22) Filed: Jul. 28, 1999

Related U.S. Application Data

(63) Continuation-in-part of application No. 09/014,870, filed on Jan. 28, 1998, now Pat. No. 6,062,378, and a continuation-in-part of application No. 08/878,810, filed on Jun. 19, 1997, now Pat. No. 5,960,938.

(51) Int. Cl.[7] .................................................. B65G 29/00
(52) U.S. Cl. ................ 198/867.13; 198/779; 198/867.14
(58) Field of Search ................................ 198/465.2, 779, 198/867.13–867.15

(56) References Cited

U.S. PATENT DOCUMENTS

| | | |
|---|---|---|
| 1,852,942 | 4/1932 | Streine . |
| 2,827,089 | 3/1958 | Amori . |
| 2,929,484 | 3/1960 | Longdon . |
| 3,092,237 | 6/1963 | Miller . |
| 3,221,867 | 12/1965 | Bergling et al. . |
| 3,407,919 | 10/1968 | Sandefur . |
| 3,478,859 | 11/1969 | Krempel . |
| 3,646,656 | 3/1972 | Zilahy et al. . |
| 3,767,025 | 10/1973 | Louis . |
| 4,331,229 | 5/1982 | Kamm . |
| 4,389,941 | 6/1983 | Berk et al. . |
| 4,579,219 | 4/1986 | Burkhardt . |
| 4,718,349 | 1/1988 | Wahren . |
| 4,718,543 | 1/1988 | Leisner et al. . |
| 4,724,951 | 2/1988 | Shinkawa et al. . |
| 4,730,719 | 3/1988 | Brown et al. . |
| 4,736,834 | 4/1988 | Kotegawa et al. . |
| 4,742,905 | 5/1988 | Beers . |
| 4,823,459 | 4/1989 | Takeda . |
| 4,892,186 | 1/1990 | Frei . |
| 4,974,519 | 12/1990 | Miletto . |
| 5,046,598 | 9/1991 | Colamussi . |
| 5,143,205 | 9/1992 | Fujimoto . |
| 5,344,001 | 9/1994 | Kawaai et al. . |
| 5,411,130 | 5/1995 | Noestheden . |
| 5,461,851 | 10/1995 | Lehrieder et al. . |
| 5,467,860 | 11/1995 | Clopton . |
| 5,549,194 | 8/1996 | Dag . |
| 5,553,697 | 9/1996 | McClement . |
| 5,598,784 | 2/1997 | Kubsik et al. . |
| 5,960,939 | * 10/1999 | Clopton .......................... 198/867.13 |
| 6,062,378 | * 5/2000 | Clopton .......................... 198/867.13 |

FOREIGN PATENT DOCUMENTS

| | | |
|---|---|---|
| 6144534 | 5/1994 | (JP) . |
| 406183533 | 7/1994 | (JP) . |
| 6-46888 | 11/1994 | (JP) . |
| 646888 | 11/1994 | (JP) . |

* cited by examiner

*Primary Examiner*—Joseph E. Valenza
(74) *Attorney, Agent, or Firm*—Theresa Fritz Camoriano; Camoriano and Associates

(57) ABSTRACT

A system is provided, in which the drive chain has features that permit control of the threshold driving force that will be reached before the chain's carrier rollers begin to rotate to permit accumulation or slip. The threshold driving force is controlled by friction members which are located between split portions of the carrier rollers and by the angle of the outer surface of the carrier rollers as well as by the amount of force provided by a biasing member. The threshold force depends upon the angle and the amount of biasing force.

16 Claims, 14 Drawing Sheets

CHAIN DRIVE WITH ADJUSTABLE FRICTION

This application is a continuation-in-part of U.S. application Ser. No. 08/878,810, now U.S. Pat. No. 5,960,938, filed Jun. 19, 1997 and is a continuation-in-part of U.S. application Ser. No. 09/014,870, now U.S. Pat. No. 6,062,378, filed Jan. 28, 1998, both of which are incorporated herein by reference.

BACKGROUND OF THE INVENTION

The present invention relates to roller chains used for driving conveyors and other movable devices. Accumulating conveyor chains are known. These chains generally include a roller which carries a product, and, when the products begin to back up on the conveyor, the rollers begin to rotate, allowing the products to sit on top of the chain while the chain continues to run, without creating a large back line pressure on the products. A problem that can be encountered with such chains is that, if a substantial driving force is needed to move the products, the rollers may begin to rotate too soon, so that the products are not moved by the conveyor. Prior art accumulating conveyors generally do not allow control or adjustment of the threshold force at which the rollers begin to rotate.

SUMMARY OF THE INVENTION

The present invention provides a chain and drive design in which the threshold force at which the rollers begin to rotate is controlled. In the design of the present invention, the central carrier roller that carries the product or that drives the driven member is made in two pieces, and a friction member is mounted between the two roller pieces so as to restrict rotation of the roller pieces until a threshold force is reached. Also, in the preferred embodiment, the central carrier roller pieces may be tapered at various angles, in order to control the amount of friction force between the roller pieces and the friction member.

The design of the present chain may be used in any number of conveyor or drive systems where the accumulating concept is desirable.

DESCRIPTION OF THE PREFERRED EMBODIMENTS

Figure 1:
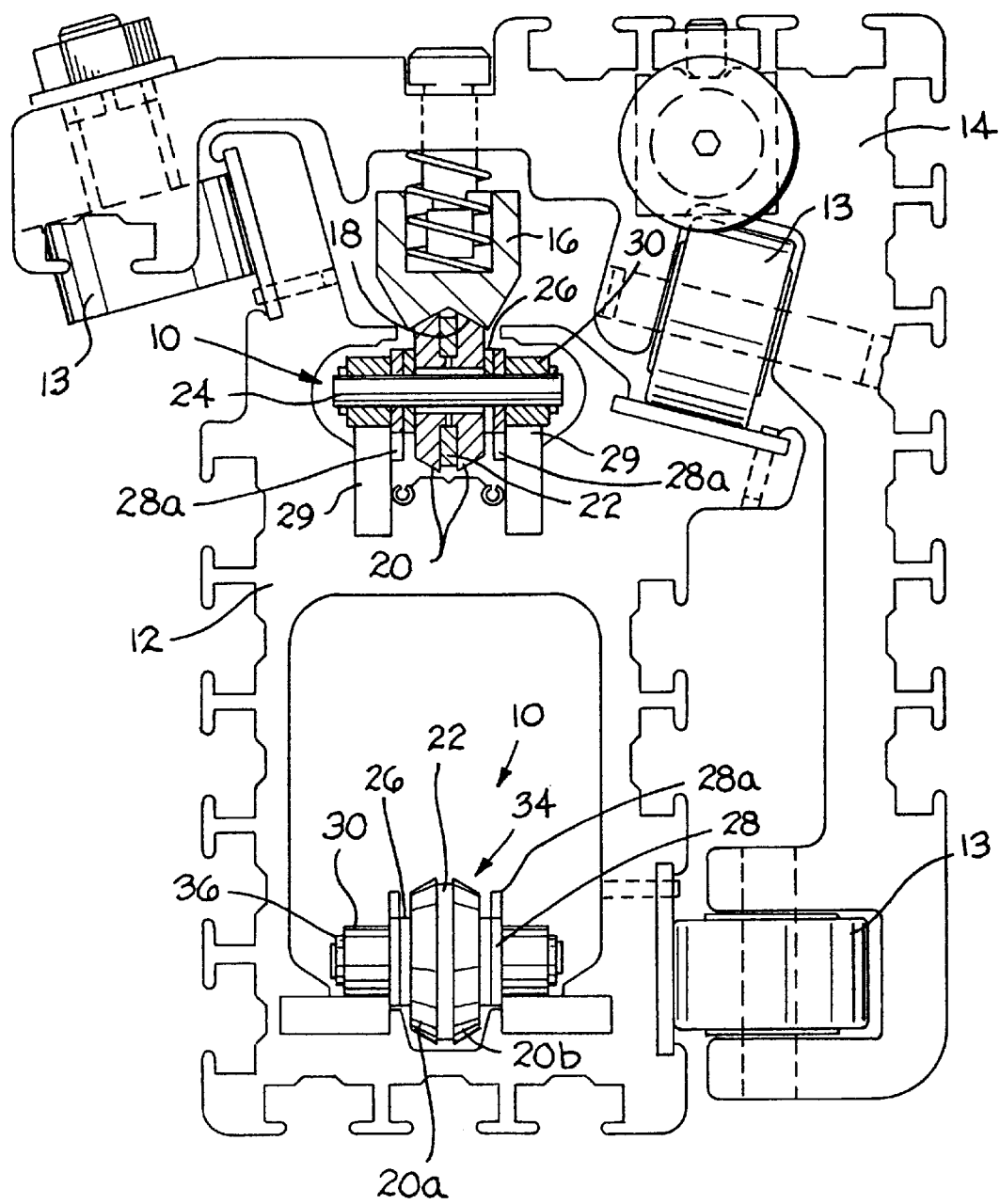
FIG. 1 is a sectional view through a conveyor using a chain made in accordance with the present invention.

FIGS. 1–5 show an example of a conveyor and chain 10 made in accordance with the present invention. FIG. 1 shows the chain 10 mounted on an extruded support frame 12, and driving a carriage 14. So, in this case, the support frame 12 is stationary and the carriage 14 is the movable member driven by the chain. The weight of the carriage 14 is carried on the support frame 12 by rollers 13, which roll along the support frame 12. While the rollers are mounted on the carriage, they could, alternatively, be mounted on the frame. The carriage 14 includes a spring-biased drive member 16, the bottom surface 18 of which has a V-shaped recess. The contour of the female V-shaped bottom surface 18 of the drive member 16 is the same as the contour 34 of the male V-shaped outer edge of the assembled carrier rollers 20 of the chain 10. As will be explained later, the slope of the V-shaped contour affects the drive force with which the chain 10 drives products being carried on the chain, and different slopes can be used, as needed. The carrier roller 20 is made in two pieces 20a, 20b, and a friction member 22 is mounted between and in friction contact with the pieces 20a, 20b. The friction member 22 prevents the carrier roller 20 from rotating until some threshold force is reached. This means that, as the chain 10 is driven, it will drive the carriages 14 until the threshold force is reached. Once the threshold force is reached, the carrier rollers 20 will rotate so that the carriages 14 remain stationary as the chain 10 passes under the carriages 14.

Figure 2:
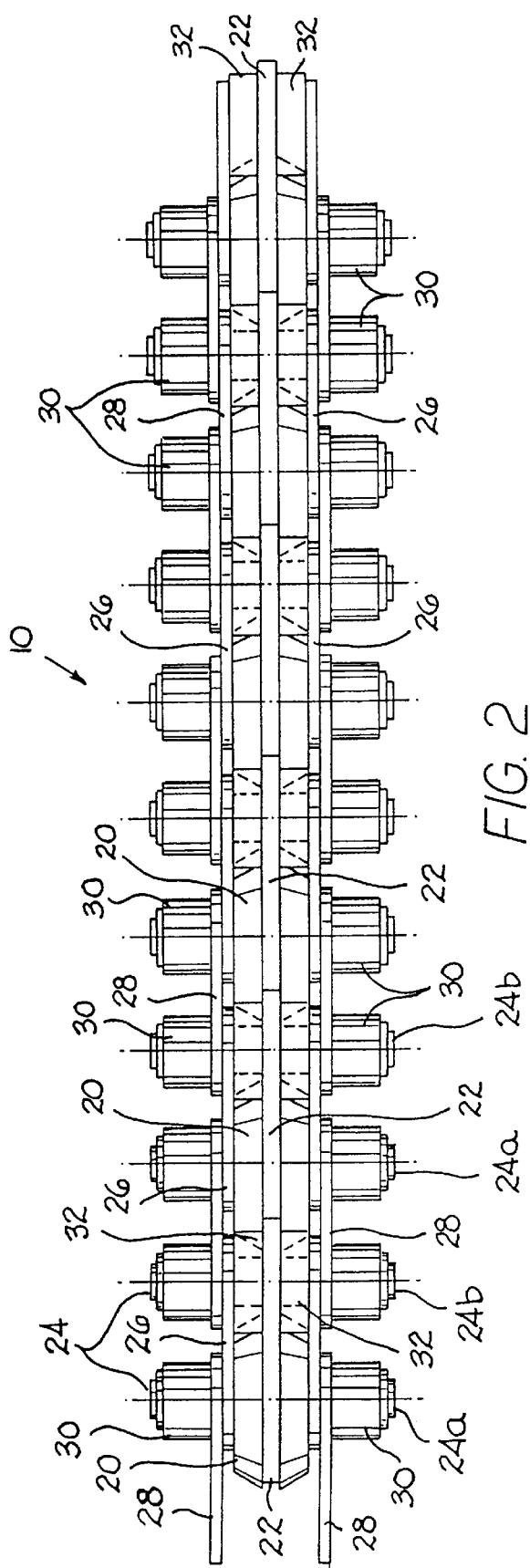
FIG. 2 is a top view of the chain of FIG. 1.
Figure 3:
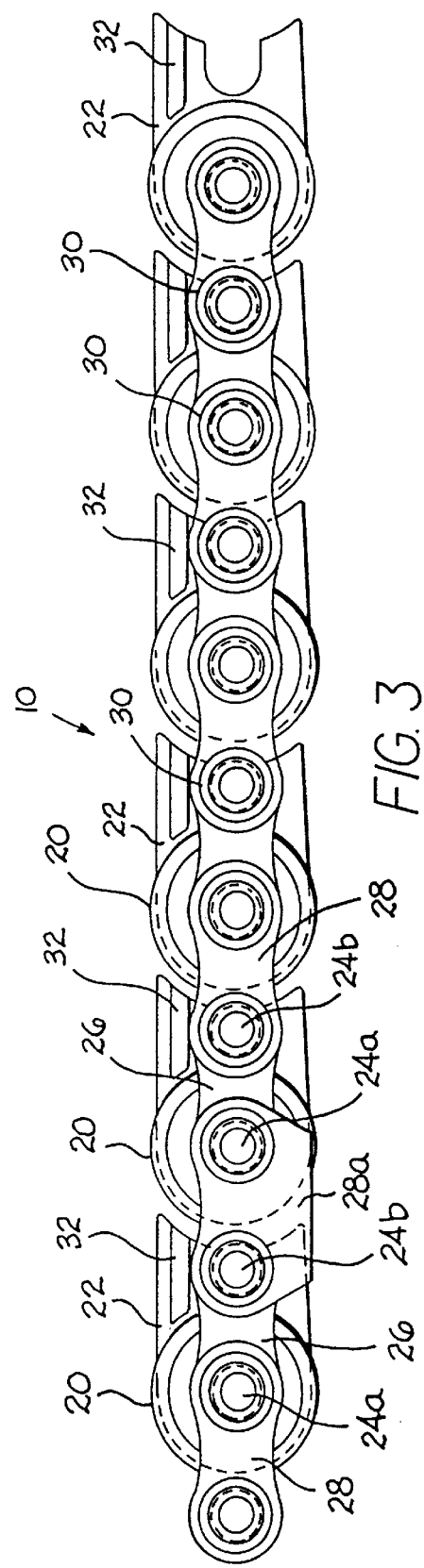
FIG. 3 is a side view of the chain of FIG. 1.

FIG. 1 also shows that, in addition to the carrier roller 20 and the friction member 22, the chain 10 includes chain pins 24, inner sidebars 26, outer sidebars 28, and outboard support rollers 30. At intervals along the chain 10 are pairs of outer guiding sidebars 28a, which project downwardly to help guide the chain 10 between the rails 29 of the frame 12. As shown in FIGS. 2 and 3, the carrier rollers 20 are mounted on every odd-numbered chain pin 24a, while the even-numbered chain pins 24b do not carry a carrier roller 20. (The use of the terms even-numbered and odd-numbered is arbitrary. The odd-numbered pins 24a may also be referred to herein as forward pins, and the even-numbered pins 24b may be referred to as rear pins.) All the chain pins 24a, 24b carry left and right support rollers 30, which roll along the frame 12 as the chain 10 is driven. The mechanism for driving the chain 10 is not shown in these drawings but includes a drive sprocket, as is well known in the art. The friction members 22 are mounted on the odd-numbered chain pins 24a but also partially encircle the even-numbered chain pins 24b, which prevents the friction members 22 from rotating relative to the chain 10. It would be possible to use other known methods to prevent the friction members 22 from rotating relative to the chain 10, such as keying the friction members 22 to the pins 24 or to the bushings 42 or press fitting them onto the chain 10, but this embodiment is preferred. Each of the friction members 22 includes horizontally-projecting wings 32, which cover a space in the chain 10, preventing dirt and debris from getting into the chain 10.

Figure 4:
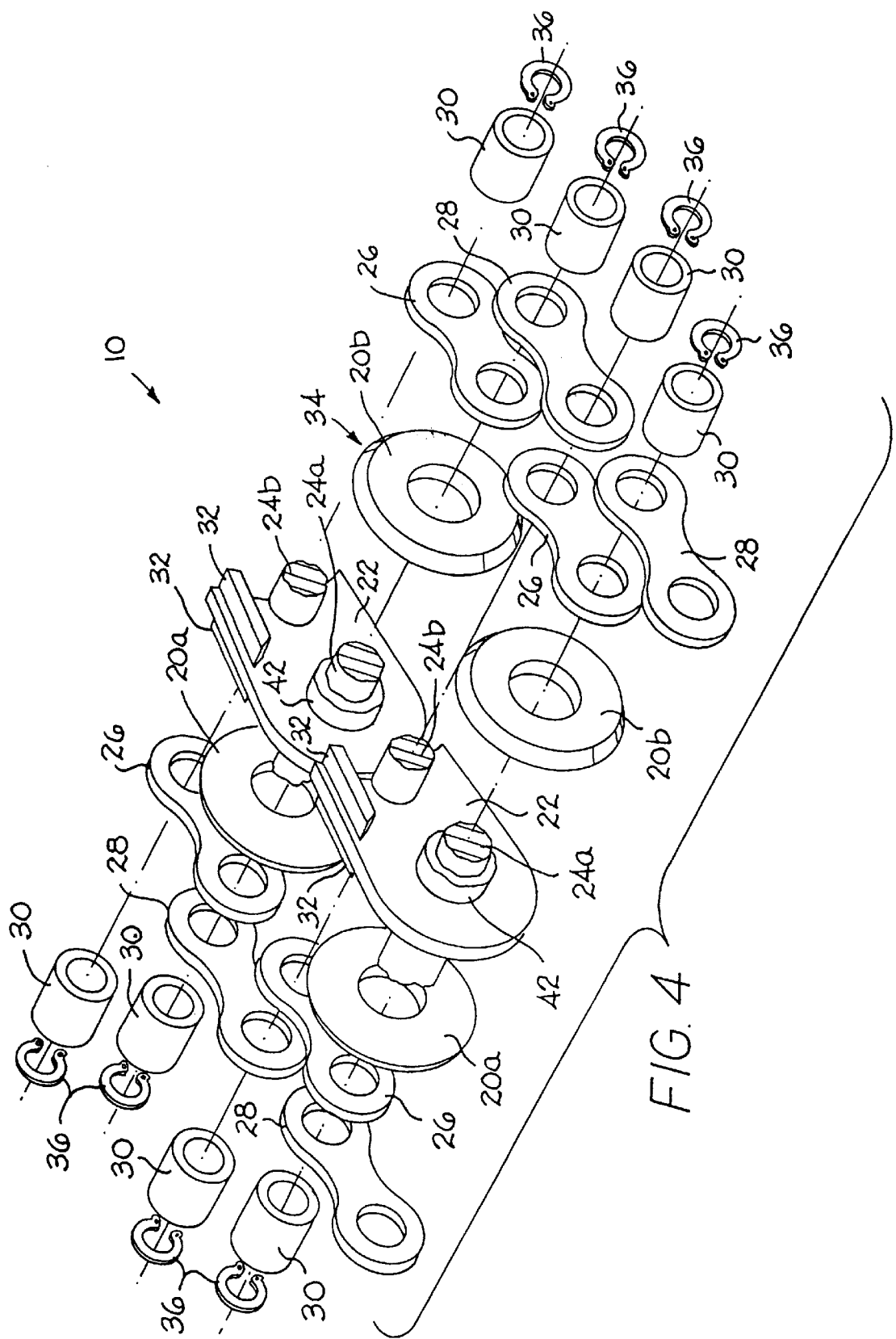
FIG. 4 is an exploded perspective view of a portion of the chain of FIG. 1.

FIG. 4 is an exploded perspective view of the chain 10, showing the odd-numbered pins 24a, the even-numbered pins 24b, the friction members 22 with wings 32, the carrier roller halves 20a, 20b, each having a tapered outer edge surface, so that, when they are put together, they form a male V-shaped drive surface 34, which contacts the complementary-shaped bottom surface 18 of the drive member 16. FIG. 4 also shows the inner sidebars 26, outer sidebars 28, support rollers 30, and snap-rings 36, which fit into ring-shaped grooves 38 in the pins 24 (shown in FIG. 5).

Figure 5:
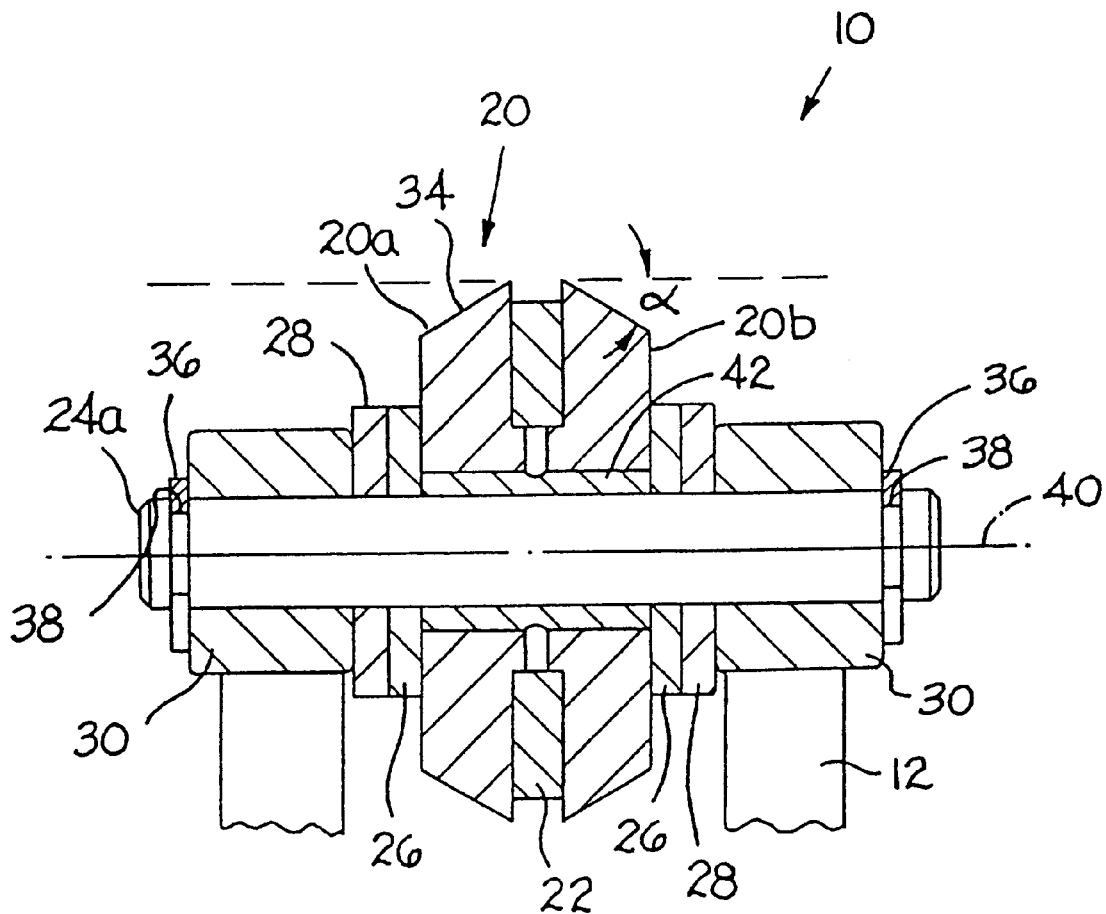
FIG. 5 is an enlarged front sectional view of the chain of FIG. 1.

FIG. 5 is the same sectional view of the chain 10 as shown in the top portion of FIG. 1, but it is enlarged to show more detail. It can be seen that there is a bushing 42, pressed onto the odd-numbered pins 24a, on which the split carrier roller 20 is mounted. As shown in this view, there is an angle a between the drive surface 34 of the carrier roller portions 20a, 20b and the horizontal (shown in phantom). The axis 40 of the pin 24 defines the horizontal direction. In this preferred embodiment, the angle a is 45°. The angle a may vary, depending upon the desired threshold friction force. The angle preferably is between 30° and 45°. The amount of horizontal force with which the carrier roller halves 20a, 20b push against the friction member 22 depends upon the angle α and the amount of force exerted on the carrier roller halves 20a, 20b by a pusher. The greater the horizontal force against the friction member 22, the greater the friction force between the friction member 22 and the carrier roller halves 20a, 20b, and the greater the threshold force required to cause rotation of the carrier rollers 20 relative to the chain 10, meaning that the chain 10 will exert a greater drive force on the products being driven before the carrier rollers 20 begin to rotate relative to the chain 10.

The threshold force of the chain may also be varied by varying the materials used to make the chain. The higher the coefficient of friction between the carrier roller portions 20a, 20b and the friction member 22, the greater the threshold force.

So, the present invention provides an arrangement whereby the threshold force of the chain may be controlled, to ensure that the products are driven up to the threshold force before the chain goes into an idling or accumulation mode, in which the carrier rollers rotate as the chain passes under the stationary products.

Figure 6:
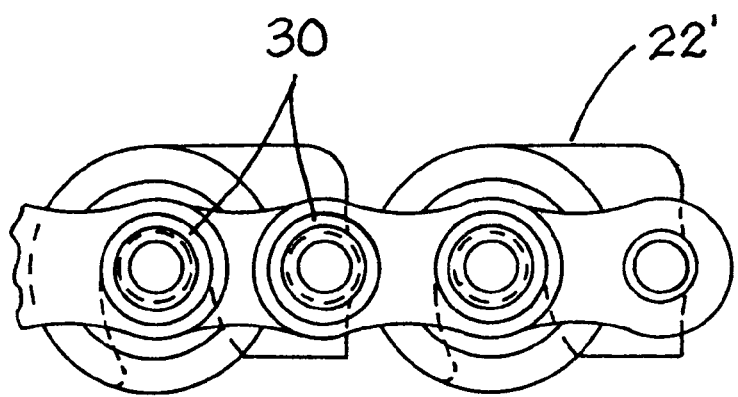
FIG. 6 is a side view of a chain similar to the chain of FIG. 1 but using an alternate embodiment of the friction member.
Figure 6A:
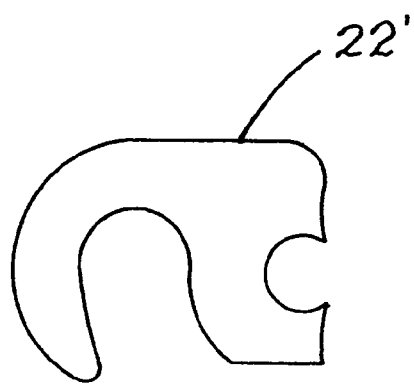
FIG. 6A is a side view of the friction member of FIG. 6.

FIGS. 6 and 6A show a chain that is identical to the chain of FIGS. 1–5, except that it uses an alternative friction member 22'. This friction member 22' can be snapped onto the chain and removed from the chain without having to disassemble the chain. This allows for ease of removal and replacement of the friction elements 22' in case of excessive wear or when it is deemed desirable to replace the friction members 22' with friction members 22' made out of a different material with a different coefficient of friction.

Figure 7:
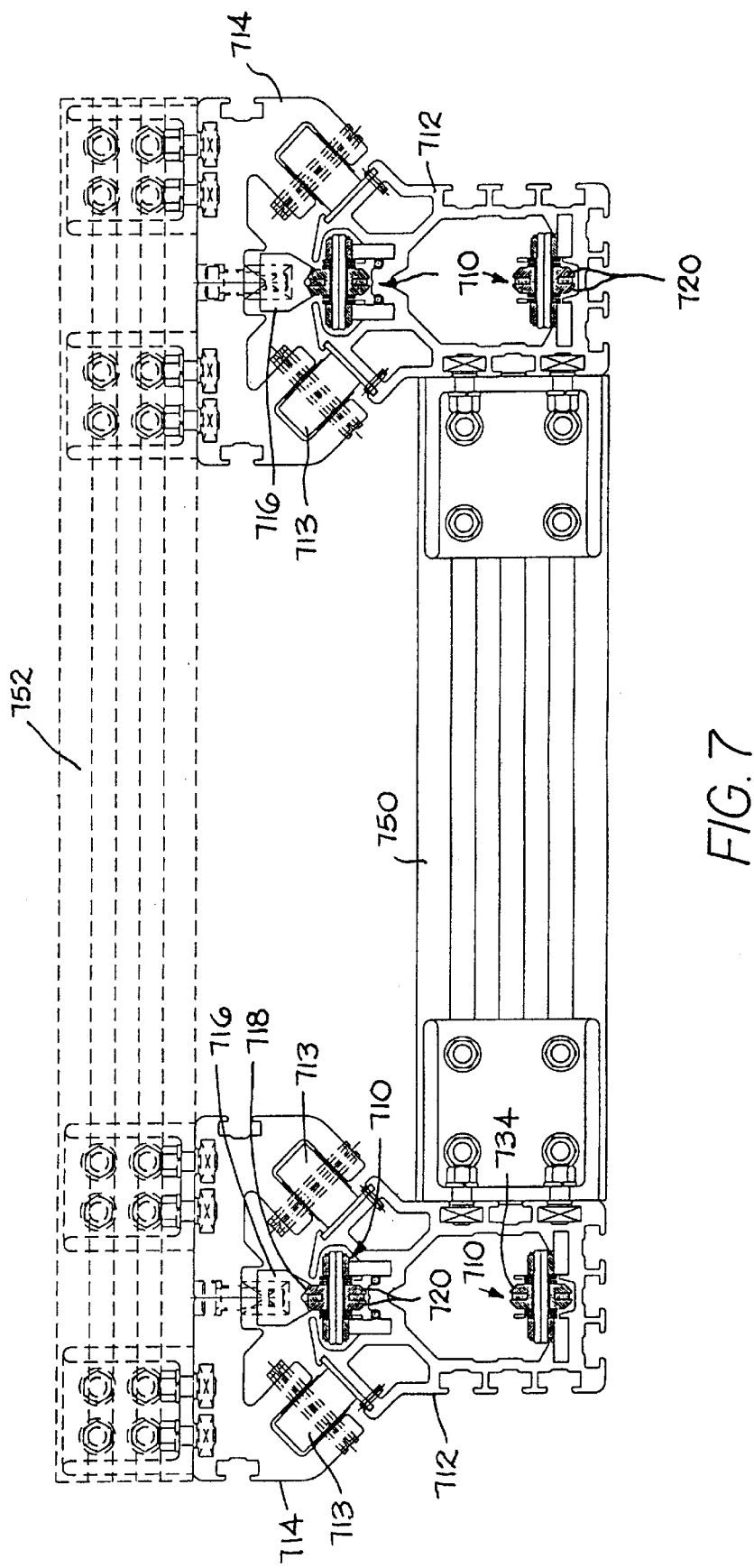
FIG. 7 is a sectional view through an alternate conveyor using the chain of FIGS. 6 and 6A.

FIG. 7 shows left and right loops of chain 710, which are identical to the chain shown in FIGS. 6 and 6A, mounted on an alternate type of conveyor system. The chains 710 are mounted on left and right fixed support frames 712, and drive a carriage 714. The weight of the carriage 714 is carried on the support frames 712 by rollers 713, which roll along the support frames 712. The rollers 713 rotate about axes that are at an angle to each other of approximately 90°, each being approximately 45° from the horizontal, and the support surfaces on the support frame 712 are at the same angle to each other, which helps keep the carriage 714 running straight on the support frames 712. The carriage 714 includes left and right spring-biased drive members 716, each of which has a V-shaped recess in its bottom surface 718. The contour of the V-shaped recess in the bottom surface 718 of the drive member 716 is the same as the contour 734 of the outer edge of the carrier rollers 720 of the chain 710.

The conveyor frames 712 are held a fixed distance apart by means of brackets 750 bolted to the frames 712. A horizontal beam 752 on the carriage 714 is used to support the product(s) being conveyed.

Figure 8:
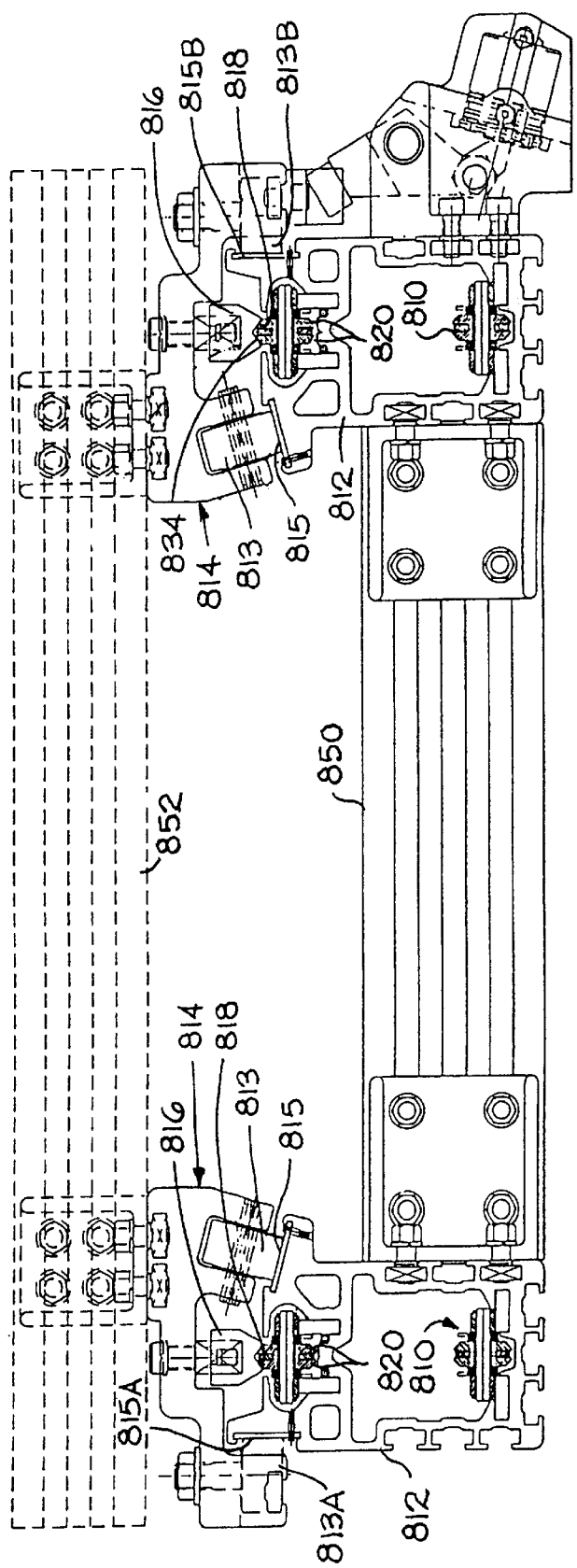
FIG. 8 is a sectional view through a second alternate conveyor using the chain of FIGS. 6 and 6A.

FIG. 8 shows a conveyor similar to the conveyor of FIG. 7, except that the angles of the wheels 813, 813A, 813B are different from the angles of the wheels in the embodiment of FIG. 7. In this case, the support surfaces 815 are angled down from the horizontal at an angle of approximately 15°, and the wheels 813 rotate about axes that lie at the same angles, so that the carriage 814 tracks correctly on the conveyor. There are also left and right guide wheels 813A, 813B, on the carriage 814, which rotate about vertical axes along vertical guide surfaces 815A, 815B, respectively. The weight of the carriage 814 is carried on the support frame 812 by the rollers 813. The two loops of chain 810 are the same as in the previous embodiment. The frame members 812 provide angled support surfaces 815, to support the wheels 813 of the carriage 814. The carriage 814 includes left and right spring-biased drive members 816, the bottom surface 818 of each of the spring-biased drive members having a V-shaped recess. The contour of the female V-shaped bottom surface 818 of the drive member 816 is the same as the contour 834 of the male V-shaped outer edge surface of the assembled carrier rollers 820 of the chain 810. Brackets 850 are bolted to the frame members 812 to hold them a fixed distance apart. Each carriage 814 includes at least one cross-member 852, which supports the products on the carriage 814.

Figure 8A:
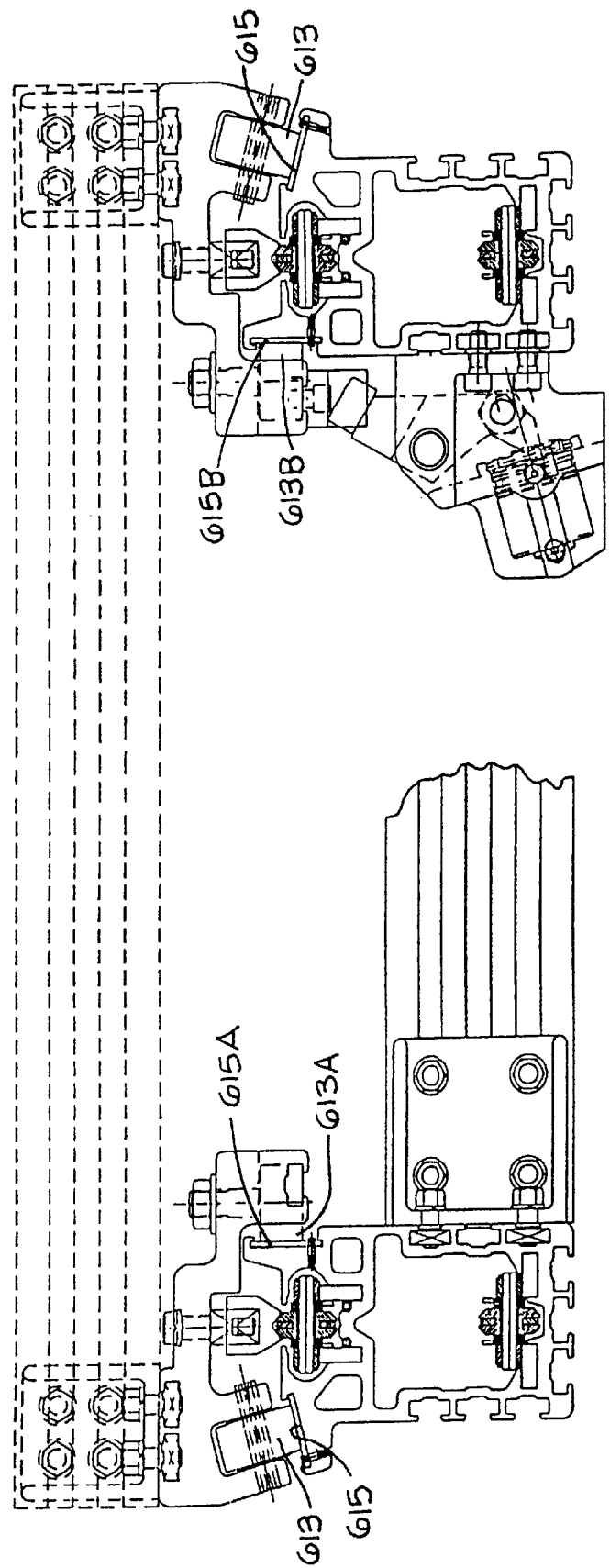
FIG. 8A is a sectional view through a third alternate conveyor using the chain of FIGS. 6 and 6A.

FIG. 8A shows an embodiment that is identical to the embodiment of FIG. 8, except that the angled support wheels 613 and their respective support surfaces 615 are on the outside, and the vertical-axis guide wheels 613A and 613B and their respective guide surfaces 615A and 615B are on the inside.

Figure 9:
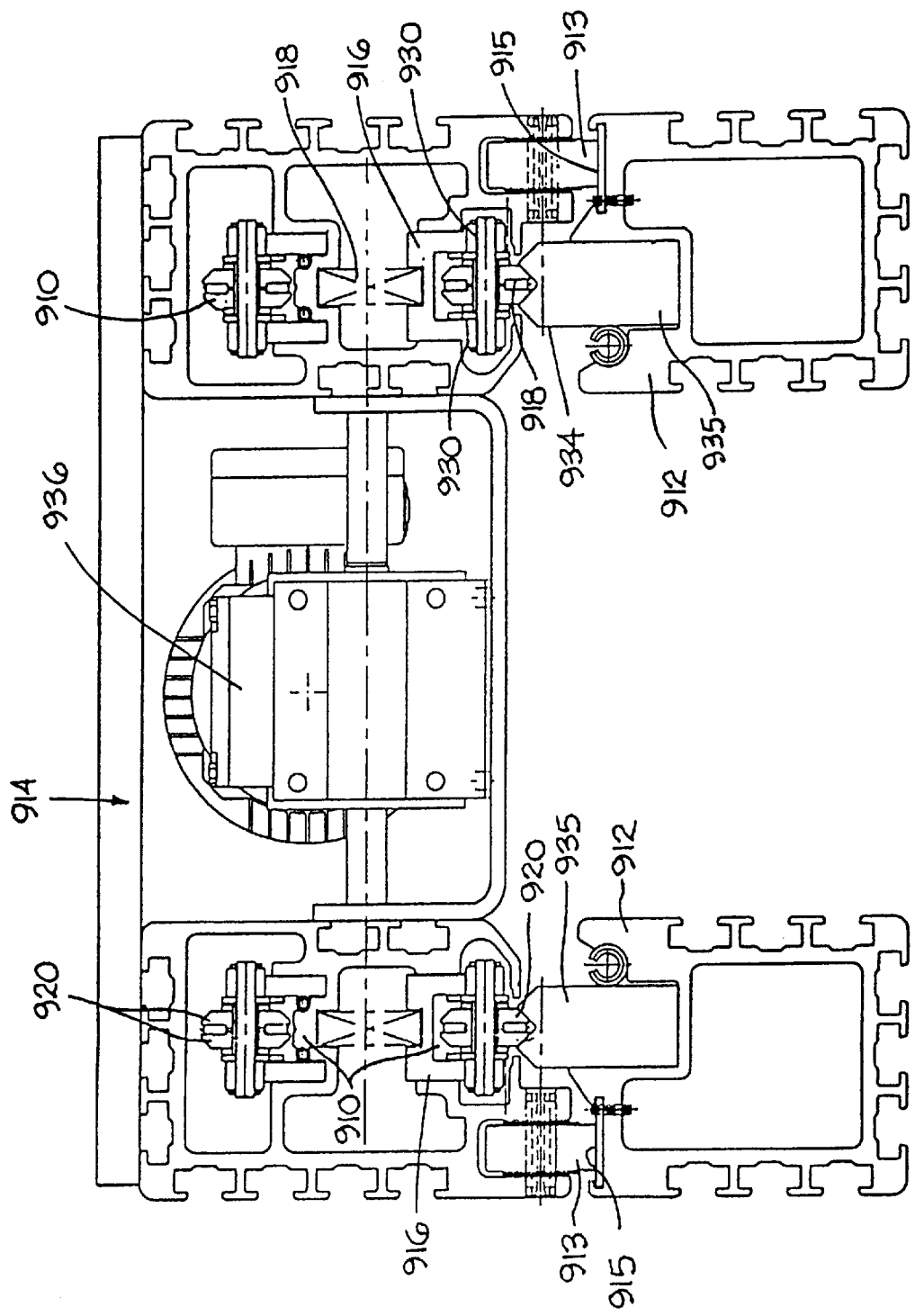
FIG. 9 is a sectional view through a fourth alternate conveyor made in accordance with the present invention, using the chain of FIGS. 6 and 6A.
Figure 10:
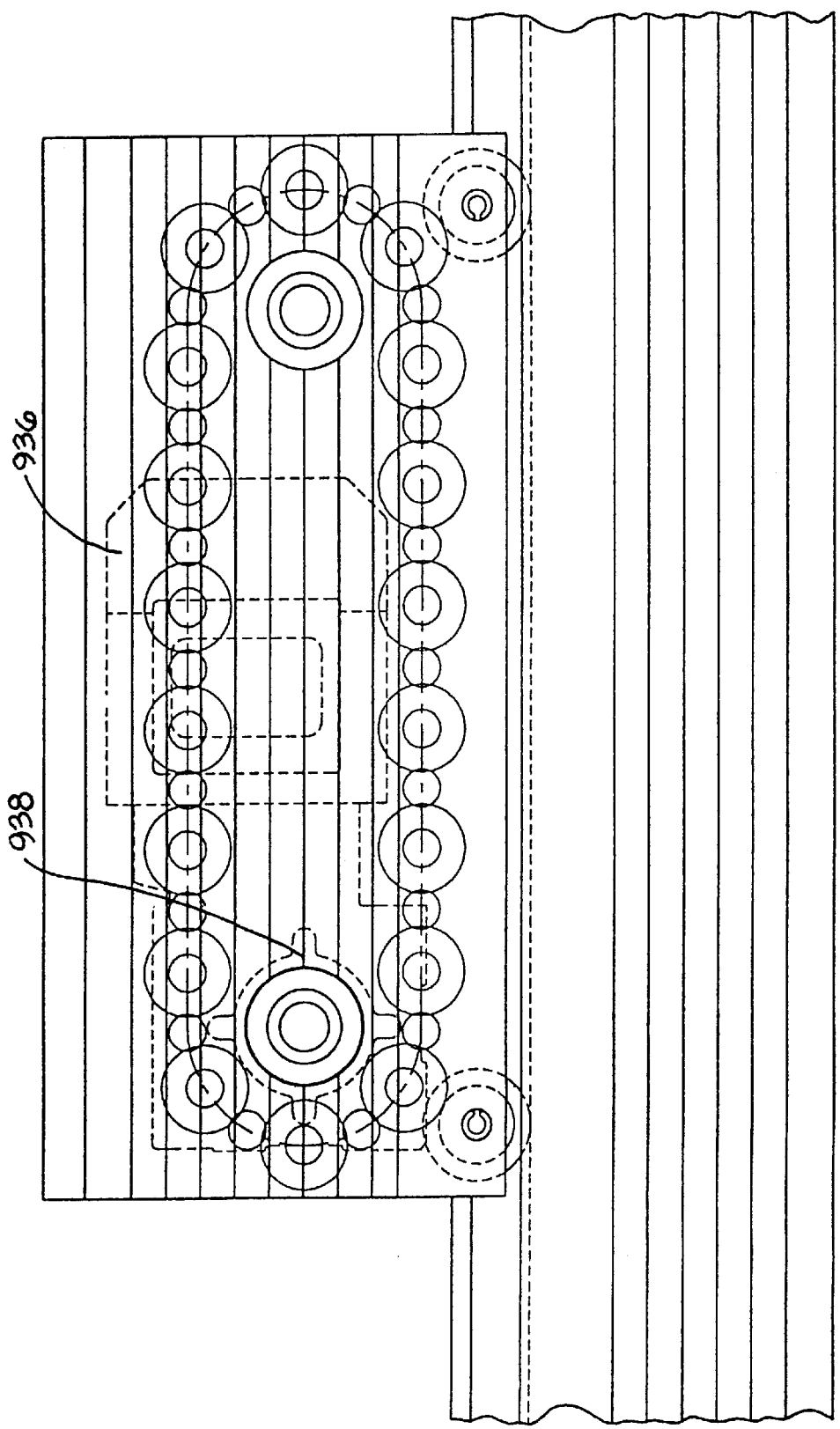
FIG. 10 is a side view of the conveyor of FIG. 9.

FIGS. 9 and 10 show another alternative embodiment of a conveyor made in accordance with the present invention. In this case, instead of the chain being mounted on the conveyor frame, the chain 910 is mounted on the carriage 914. The chain 910 is identical to the chain shown in FIGS. 6 and 6A. There are two loops of the chain 910 on the carriage 914, and they are driven by a drive motor 936, which drives sprockets 938, which drive the chains 910. So, in this case, the movable member, which is the pallet, is motorized and drives itself along the left and right conveyor frame members 912. The motor 936 preferably is an electric motor. The weight of the carriage 914 is carried on the support frame 912 by horizontal-axis rollers 913, which roll along horizontal support surfaces 915 on the frame members 912. The carriage 914 includes biased drive members 916, which push down on the outer rollers 930 of the chains 910, so as to push the respective chains 910 downwardly, against female V-shaped carry-ways 935 on the frame members 912. The female V-shape of the carry-ways 935 has the same contour as the male V-shape of the carrier rollers 920. The pusher 918, which pushes down on each drive member 916, may be a simple spring, or it may be a solenoid, which would enable it to adjust the amount of force applied to the drive member 916.

Figure 11:
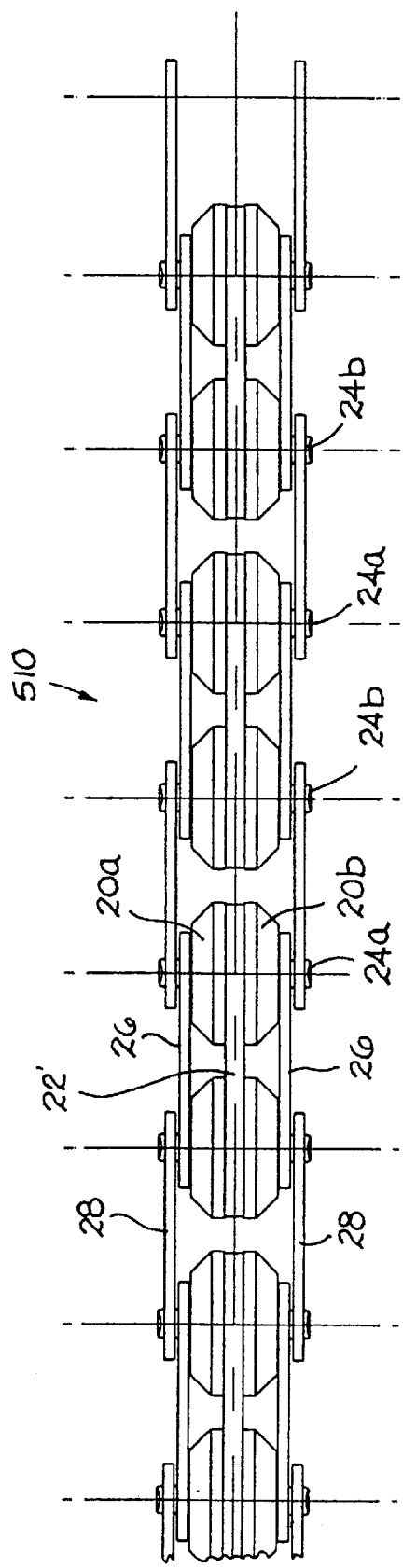
FIG. 11 is a top view of an alternative adjustable friction chain.
Figure 12:
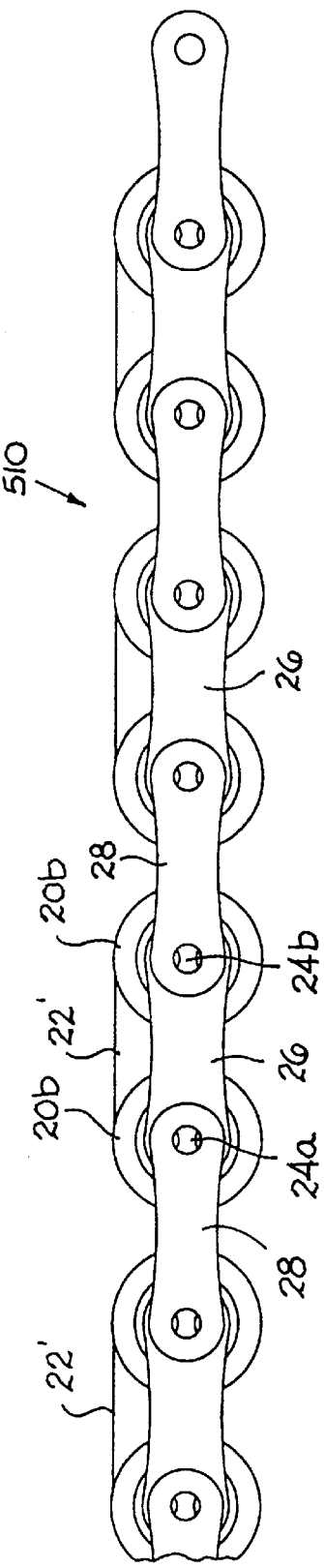
FIG. 12 is a side view of the chain of FIG. 11.

FIGS. 11 and 12 show an adjustable friction chain 510, which is identical to the chain of FIG. 6, except that it does not have the outer rollers 30, and the split carrier roller halves 20a, 20b are mounted on every pin rather than every other pin. This chain includes left and right carrier roller halves 20a, 20b, chain pins 24a, 24b, inner sidebars 26, outer sidebars 28, and friction pads 22'. The friction pads 22' lie between the roller halves 20a, 20b and are mounted on the forward pins 24a and the rear pins 24b to prevent them from rotating. The left and right roller halves 20a, 20b have tapered outer edges, which, when assembled together, form a V-shaped projection.

Figure 13:
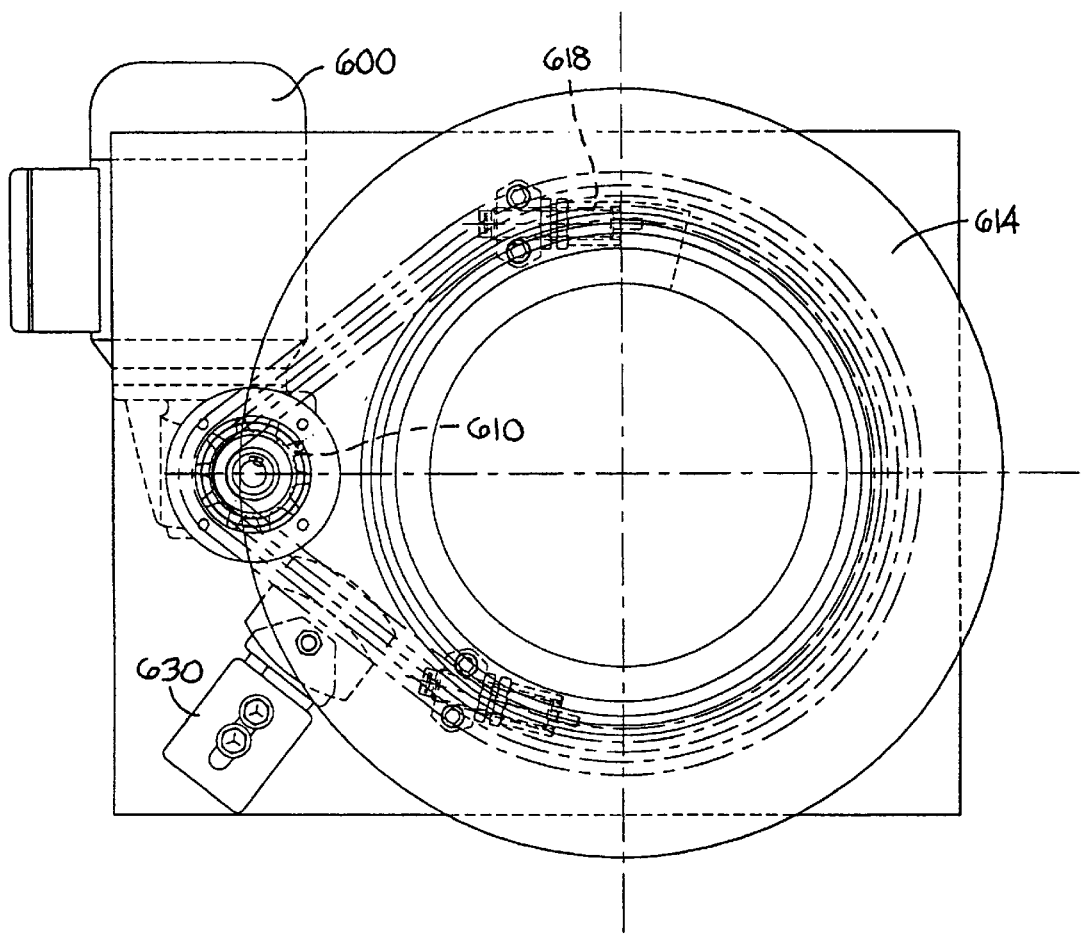
FIG. 13 is a top view of a lift/turntable using the chain of FIG. 6.
Figure 14:
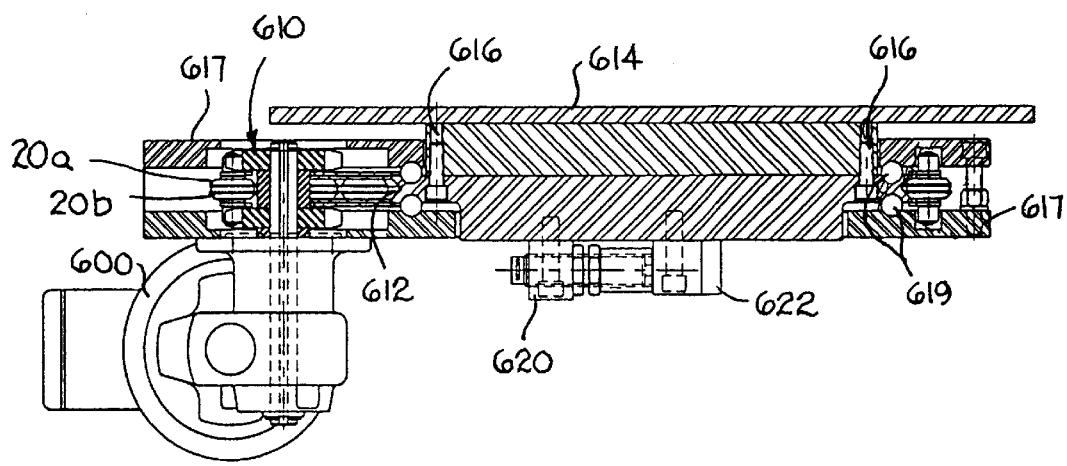
FIG. 14 is a side sectional view of the lift/turntable of FIG. 13.
Figure 15:
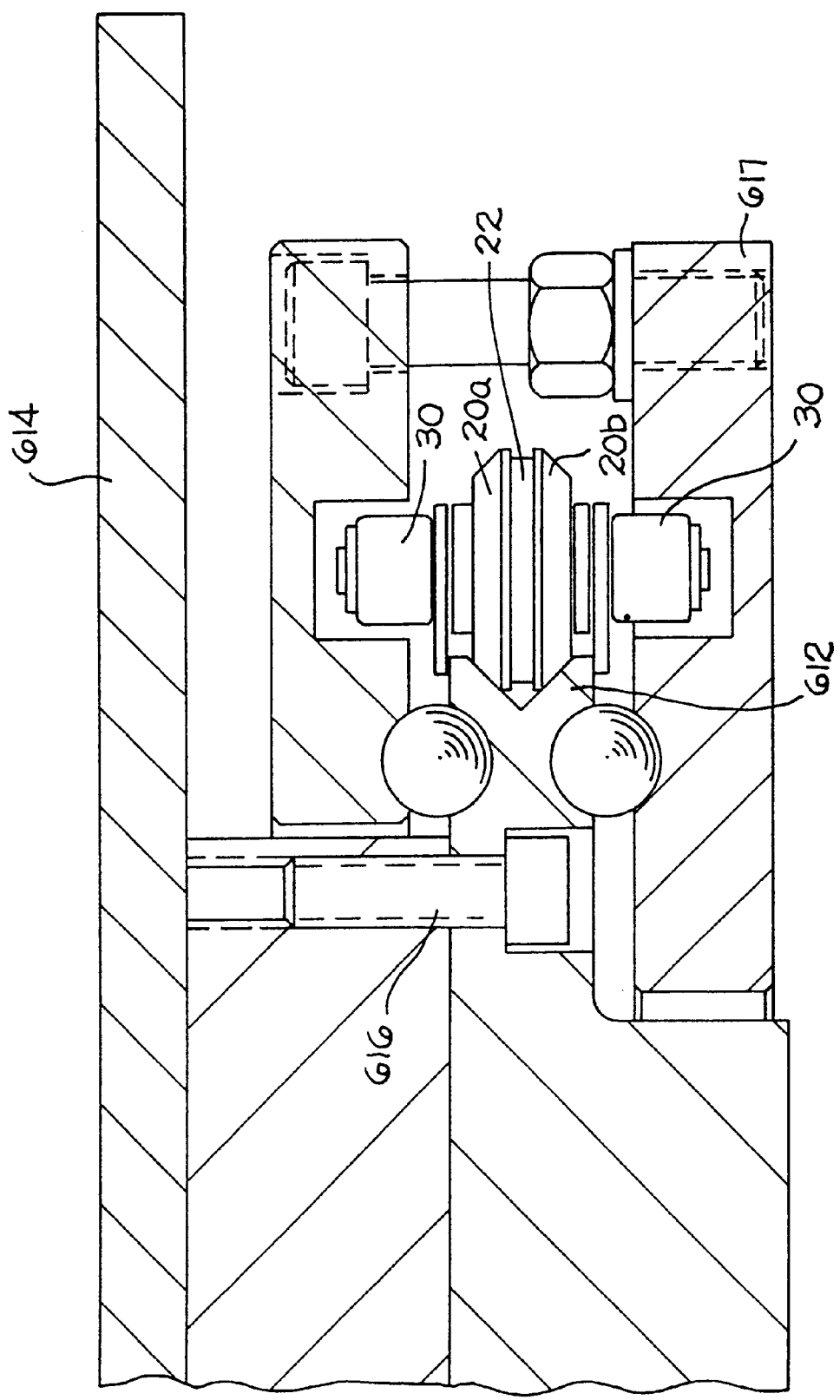
FIG. 15 is an enlarged view of the right side of FIG. 14.

FIGS. 13–15 show a turntable for a conveyor system, which is driven by the chain of FIG. 6. The chain is driven by a motor 600 and a double sprocket 610 and is wrapped around a circular V-shaped track 612, which is fastened to the table 614 by pins 616, so that the track 612 rotates with the table 614 (See FIG. 15.). The sprocket 610 is a double sprocket, which drives on the outboard rollers 30 of the chain. The motor 600 is mounted on a fixed frame 617, and the table 614 is supported on the frame 617 by ball bearing rollers 619. The stationary support 617 for the table 614 includes stationary shock-absorbing stop blocks 618, 620, and the table 614 carries a stop block 622, so that, when the table 614 is rotated in a clockwise direction, it will be stopped when the stop block 622 hits the shock-absorbing stop block 620, and, when it is rotated in a counterclockwise direction, it will be stopped when the stop block 622 hits the shock-absorbing stop block 618. While the shock-absorbing stop blocks 618, 620 are fixed on the stationary support 617 in this embodiment, it would be possible to mount them on solenoids so they can move into and out of position and to provide several of them, so as to provide any number of possible stop positions.

A chain tension adjuster 630 applies the desired amount of force to tension the chain, and this controls the amount of force with which the split roller halves 20a, 20b are pressed against the V-track 612, and the amount of friction between the friction members 22' and their respective roller halves 20a, 20b, thereby controlling the amount of force with which the chain will drive before the roller halves 20a, 20b begin to rotate. When the table 614 is stopped, because the stop block 622 has run up against one of the shock-absorbing stop blocks 618, 620, the chain will simply run relative to the stopped table 614, with the roller halves 20a, 20b rotating relative to the track 612 and relative to the friction pads 22'. When there is no stop block interfering with the travel of the table 614, the friction between the split rollers 20a, 20b and the friction pads 22' is sufficient to prevent the rollers 20a, 20b from rotating, so their contact with the V-track 612 will cause the table to be driven. The drive gearmotor 600 can change direction, so that the table is rotated from one stop position to the other and then back again.

Figure 16:
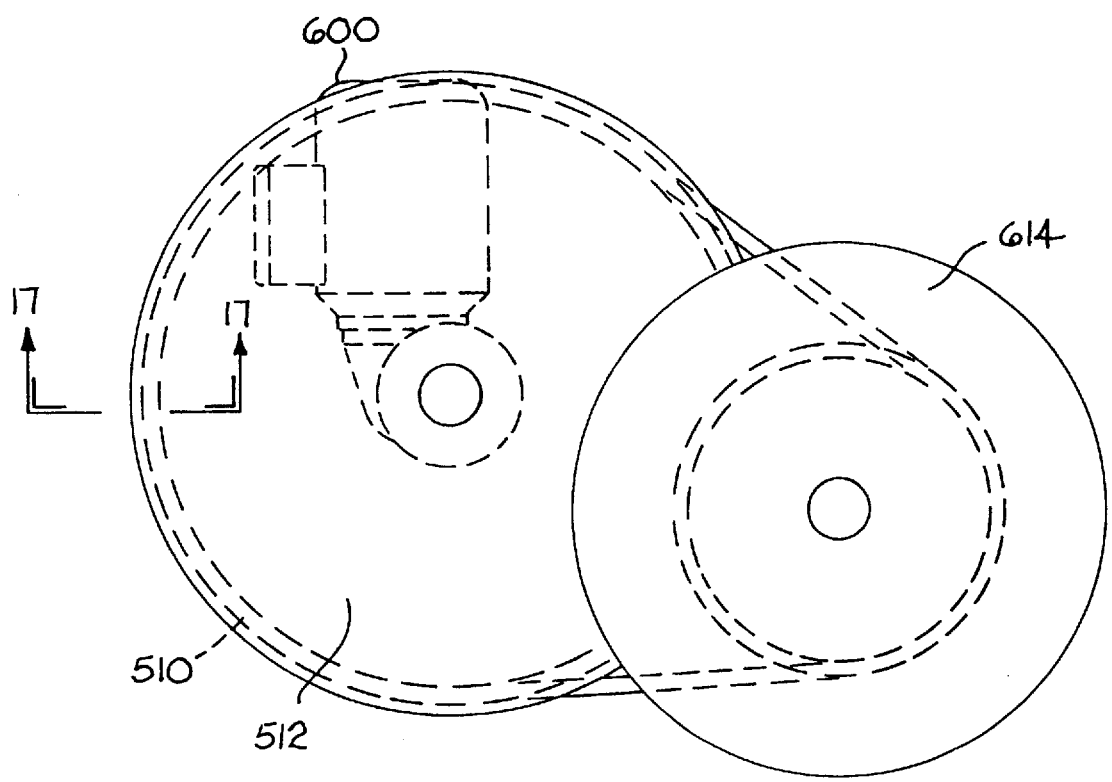
FIG. 16 is a top view of a turntable being driven by the chain of FIGS. 11 and 12.
Figure 17:
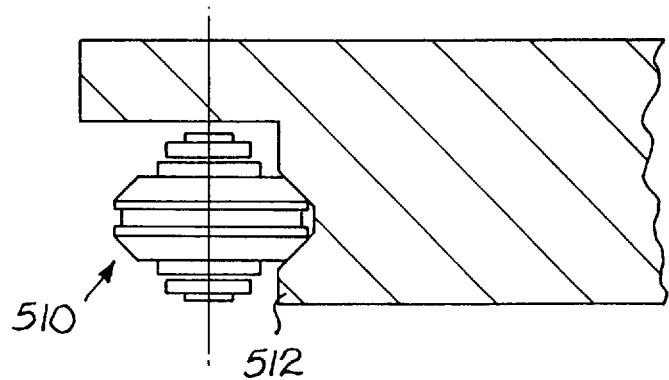
FIG. 17 is a view along the section 17—17 of FIG. 16.

FIGS. 16 and 17 show a drive arrangement similar to the arrangement of FIGS. 13–15, except that the chain 510 of FIGS. 11 and 12 is used, and the chain is driven by a V-shaped pulley 512 rather than by a sprocket. The pulley 512 is driven by a gear motor 600, and the chain 510 wraps around the pulley 512 and around the V-track in the turntable 614.

It will be obvious to those skilled in the art that modifications may be made to the embodiments described above without departing from the scope of the present invention.

What is claimed is:

1. A conveyor, comprising:
    a conveyor frame;
    a carriage, having rollers which roll along said conveyor frame; and
    an adjustable friction chain, which drives said carriage along said conveyor frame, said chain including:
        a plurality of links, each link including left and right sidebars; chain pins extending through the sidebars; split carrier rollers rotatably mounted on the chain pins; each of said split carrier rollers comprising two separate roller pieces; and a friction member mounted between and in friction contact with said carrier roller pieces so as to restrict rotation of the carrier roller pieces until a threshold force is reached.

2. A conveyor as recited in claim 1, and further comprising a biased drive member, which exerts force against said carrier rollers.

3. A conveyor as recited in claim 2, wherein the split carrier rollers form a male, V-shaped outer edge and wherein the chain drives against a corresponding V-shaped female surface in order to drive the carriage along the frame.

4. A conveyor as recited in claim 3, wherein said chain is mounted on said conveyor frame.

5. A conveyor as recited in claim 3, wherein said chain is mounted on said carriage.

6. A conveyor as recited in claim 1, and further comprising left and right support rollers mounted on each of said chain pins.

7. A conveyor, comprising:
    a support frame;
    a movable member that moves relative to the frame;
    a drive chain mounted on one of said support frame and said movable member; said drive chain including left and right sidebars; chain pins mounted on said sidebars; split carrier rollers mounted on said chain pins; friction members mounted between the split carrier rollers; said split carrier rollers defining tapered outer edge surfaces;
    a complementary-shaped recessed tapered drive surface mounted on the other of said support frame and said movable member, said complementary-shaped tapered drive surface receiving the outer edge surfaces of the carrier rollers, such that the carrier rollers will drive against the tapered drive surface until the friction force between the split carrier rollers and the friction members is overcome, and then the carrier rollers will rotate, allowing the chain to move relative to the tapered drive surface.

8. A chain drive, comprising:
    a roller chain, including sidebars; chain pins connecting the sidebars together; left and right carrier roller portions mounted for rotation on the sidebars and defining an outer edge; non-rotating friction members mounted between the left and right carrier roller portions; and
    a drive member defining a recessed surface which contacts the outer edge of the carrier roller halves.

9. A chain drive as recited in claim 8, and further comprising a biasing member mounted so as to push the roller portions and drive member together.

10. A chain drive, as recited in claim 9, wherein said biasing member is a chain tensioner.

11. A chain drive, as recited in claim 9, wherein said biasing member pushes the chain against the drive member.

12. A chain drive, as recited in claim 9, wherein said biasing member pushes the drive member against the chain.

13. A chain drive as recited in claim 8, wherein the recess has a taper so that contact between the chain and the drive member pushes the roller portions against their respective friction members.

14. A chain drive, as recited in claim 8, wherein the drive member is mounted on a carriage and the chain is mounted on a conveyor frame.

15. A chain drive, as recited in claim 8, wherein the drive member is mounted on the conveyor frame and chain is mounted on the carriage.

16. A chain drive, as recited in claim 8, wherein the drive surface is around the edge of a turntable.

* * * * *

UNITED STATES PATENT AND TRADEMARK OFFICE
CERTIFICATE OF CORRECTION

PATENT NO. : 6,237,755 B1
DATED : May 29, 2001
INVENTOR(S) : Robert T. Clopton

Page 1 of 1

It is certified that error appears in the above-identified patent and that said Letters Patent is hereby corrected as shown below:

Column 2,
Line 1, delete "1 1" and insert therefor -- 11 --.

Column 3,
Line 15, following "there is an angle" delete "a" and insert therefor -- α --.
Line 19, following ", the angle" delete "a" and insert therefor -- α --.
Line 19, following "The angle" delete "a" and insert therefor -- α --.

Signed and Sealed this

Twenty-ninth Day of January, 2002

Attest:

Attesting Officer

JAMES E. ROGAN
Director of the United States Patent and Trademark Office